(12) United States Patent
Janus et al.

(10) Patent No.: US 11,275,060 B2
(45) Date of Patent: Mar. 15, 2022

(54) DEVICE FOR PREPARING A LIQUID SAMPLE FOR A GAS CHROMATOGRAPH

(71) Applicant: TRASIS S.A., Ans (BE)

(72) Inventors: Alexander Janus, Hamburg (DE); Reinhard Grugel-Endress, Lauf (DE)

(73) Assignee: TRASIS S.A., Ans (BE)

( * ) Notice: Subject to any disclaimer, the term of this patent is extended or adjusted under 35 U.S.C. 154(b) by 0 days.

(21) Appl. No.: 16/638,476

(22) PCT Filed: Aug. 13, 2018

(86) PCT No.: PCT/EP2018/071903
§ 371 (c)(1),
(2) Date: Feb. 12, 2020

(87) PCT Pub. No.: WO2019/034596
PCT Pub. Date: Feb. 21, 2019

(65) Prior Publication Data
US 2020/0363378 A1 Nov. 19, 2020

(30) Foreign Application Priority Data
Aug. 14, 2017 (DE) ...................... 10 2017 118 531.3

(51) Int. Cl.
*B01D 71/36* (2006.01)
*G01N 30/02* (2006.01)
(Continued)

(52) U.S. Cl.
CPC ............. *G01N 30/06* (2013.01); *B01D 71/36* (2013.01); *B01D 71/40* (2013.01); *G01N 30/16* (2013.01);
(Continued)

(58) Field of Classification Search
CPC ........ G01N 30/04; G01N 30/06; G01N 30/16; G01N 30/14; G01N 30/6095;
(Continued)

(56) References Cited

U.S. PATENT DOCUMENTS

| 4,590,098 A | 5/1986 | Kazuse et al. |
| 5,235,843 A * | 8/1993 | Langhorst ................ G01N 1/34 |
| | | 73/19.02 |

(Continued)

FOREIGN PATENT DOCUMENTS

| DE | 2604003 A1 | 8/1977 |
| EP | 2927681 A1 | 10/2015 |

(Continued)

*Primary Examiner* — Bradley R Spies
(74) *Attorney, Agent, or Firm* — Leydig, Voit & Mayer, Ltd.

(57) ABSTRACT

A device for preparing a liquid sample for a direct injection of a corresponding gaseous sample to a micro-gas chromatograph includes: a fluid space and a gas space, which spaces are separated by a semipermeable separating layer, the fluid space including a supply line for the liquid sample, and the gas space having an outlet connectable with the gas chromatograph. The fluid space and/or the gas space is associated with at least one heating element. The device absorbs a sample volume of approximately 10 μl to 30 μl. The separating layer has a thickness of 10 μl to 300 μl and pores having a size between 0.05 μl and 5 μl.

10 Claims, 5 Drawing Sheets

(51) Int. Cl.
*G01N 30/06* (2006.01)
*G01N 30/16* (2006.01)
*G01N 30/60* (2006.01)
*B01D 71/40* (2006.01)
*G01N 30/14* (2006.01)

(52) U.S. Cl.
CPC ..... *G01N 30/6095* (2013.01); *B01D 2325/02* (2013.01); *B01D 2325/38* (2013.01); *G01N 2030/025* (2013.01); *G01N 2030/065* (2013.01); *G01N 2030/146* (2013.01)

(58) Field of Classification Search
CPC ....... G01N 2030/065; G01N 2030/022; G01N 2030/025; G01N 2030/143; G01N 2030/146; B01D 71/36; B01D 71/34; B01D 71/48; B01D 71/56; B01D 71/26; B01D 71/10; B01D 2325/04; B01D 2325/02; B01D 2325/36; B01D 2325/38; B01D 2325/12; B01D 61/36; B01D 61/362; B01D 61/368; B01D 2311/06; B01D 2311/14; B01D 2311/13; B01D 2311/26; B01D 2311/2626; B01D 2311/2661; B01D 2313/38; B01D 2313/20; B01D 2313/40; B01D 2315/10; B01D 63/08; B01D 63/082; B01D 63/088
See application file for complete search history.

(56) References Cited

U.S. PATENT DOCUMENTS

| | | | |
|---|---|---|---|
| 5,492,838 A | 2/1996 | Pawliszyn | |
| 5,582,735 A * | 12/1996 | Mancusi, III | B01D 53/22 210/640 |
| 6,387,269 B1 * | 5/2002 | Eltner | B01D 53/228 210/490 |
| 2005/0211624 A1 * | 9/2005 | Vane | B01J 20/103 210/500.37 |
| 2006/0000778 A1 * | 1/2006 | Childs | B01D 61/362 210/644 |
| 2006/0272500 A1 * | 12/2006 | Keller | B01D 53/04 95/46 |
| 2012/0055332 A1 * | 3/2012 | Mahoney | B01D 63/087 95/8 |

FOREIGN PATENT DOCUMENTS

| | | |
|---|---|---|
| GB | 1545692 A | 5/1979 |
| GB | 2392114 A | 2/2004 |
| WO | WO 02088671 A1 | 11/2002 |
| WO | WO 2009151557 A1 | 12/2009 |

* cited by examiner

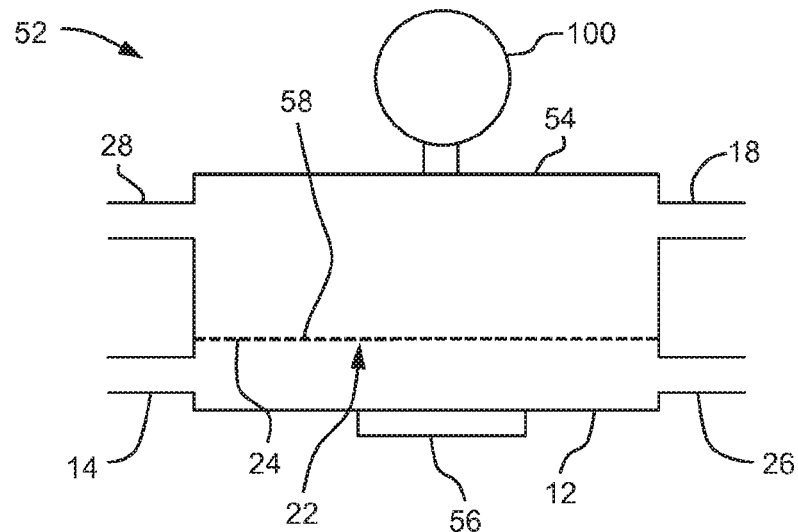
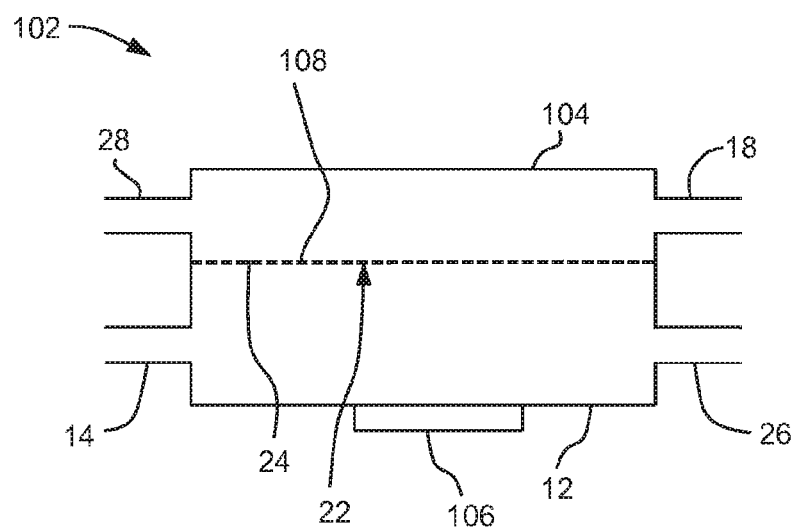

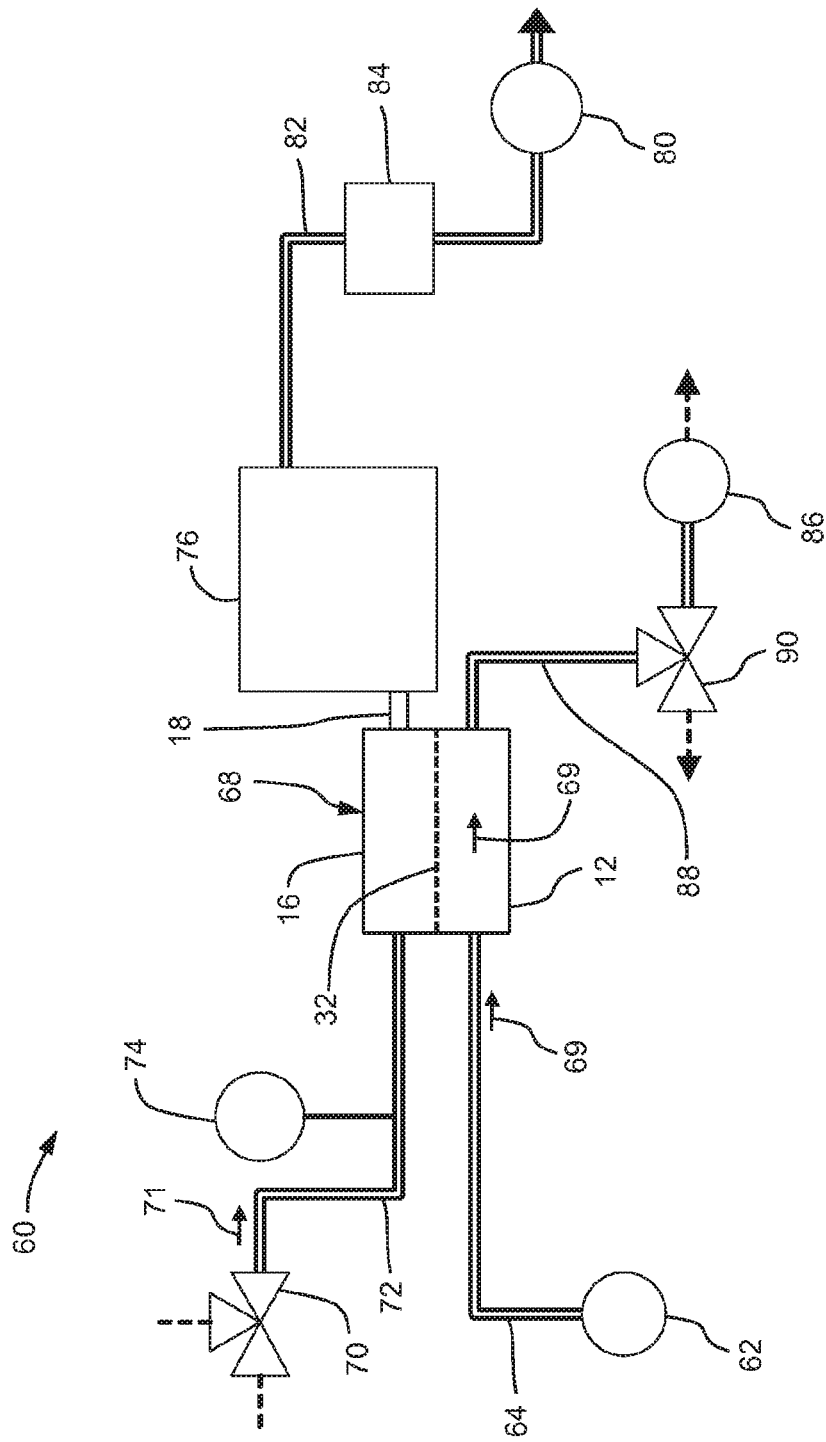

US 11,275,060 B2

DEVICE FOR PREPARING A LIQUID SAMPLE FOR A GAS CHROMATOGRAPH

CROSS-REFERENCE TO PRIOR APPLICATIONS

This application is a U.S. National Phase application under 35 U.S.C. § 371 of International Application No. PCT/EP2018/071903, filed on Aug. 13, 2018, and claims benefit to German Patent Application No. DE 10 2017 118 531.3, filed on Aug. 14, 2017. The International Application was published in German on Feb. 21, 2019 as WO 2019/034596 under PCT Article 21(2).

FIELD

This invention relates to a device for preparing a liquid sample for a gas chromatograph, comprising a fluid space having a supply line for the liquid sample and a gas space having an outlet that can be connected with the gas chromatograph.

BACKGROUND

Normally, liquid samples that are being examined for solvent residues or other organic components are analysed in a gas chromatograph. The liquid sample is directly injected into an injector, where it quickly evaporates. The sample, or parts thereof, are then supplied to a separating column for gas-chromatographic separation. The various components of the sample are separated as they flow through, and subsequently passed to a detector, where they are converted into electrical signals that can be analysed. Frequently, however, the sample will contain components that cannot be directly injected because they may damage the injector, the separating column, or the detector or cause them to malfunction. In this case, a larger amount of sample is extracted and evaporated in a separate vessel, also known as a headspace evaporator. This is a glass that is sealed and heated so that the components of the sample being analysed, or 'analyte(s)', leave the liquid and can be enriched in the gaseous phase. This generally occurs in the range of, or above, the boiling point of the analyte. If equilibrium has been reached in the gaseous phase, a sample is extracted from it and injected into the gas chromatograph. The interfering components of the sample generally remain in the liquid (or 'carrier liquid'). To prepare a sample in a headspace evaporator, typically, a sample volume of 1-10 ml is required, whilst a sample volume of approximately 1-10 µl is sufficient for direct injection into the gas chromatograph.

U.S. Pat. No. 5,492,838 concerns a method and device for continuous fluid extraction and analysis by means of a membrane. To this end, two fluid chambers are separated by a semipermeable structure. The fluid with the substance to be extracted flows through the one chamber, whilst the extracting fluid flows through the other. The substance may be a gas to be supplied to a gas chromatograph. Preferred membranes are hydrophobic, and consist of silicone or polypropylene. The chambers may be formed as adjacent cuboids or as concentric cylinders.

U.S. Pat. No. 4,590,098 describes ways of producing anisotropic membranes from polymers coated with a particularly thin silicone film. Various organic solvents and gases can be separated with these composite membranes. For example, they may be used in devices having a first fluid chamber in order to separate it from a second, smaller fluid chamber. A fluid mixture is passed by the composite membrane, which is supported by a sintered, porous metal plate. In the process, one of the fluids from the mixture can penetrate the membrane and thus be separated.

DE 26 04 003 A1 discloses a device for separating gases from liquids. The device comprises a reservoir tube consisting of an elongated cylindrical sleeve with a feed and a drain. The inner wall of the tube is provided with a coil that may be formed as a single thread. A separation tube with sieve-like openings is arranged within the reservoir tube. A hydrophobic film through which the gas present in the liquid can pass and be suctioned off is wrapped over these openings.

GB 2 392 114 A discloses a device according to the preamble of claim 1.

SUMMARY

In an embodiment, the present invention provides a device for preparing a liquid sample for a direct injection of a corresponding gaseous sample to a micro-gas chromatograph, the device comprising: a fluid space and a gas space, which spaces are separated by a semipermeable separating layer, the fluid space comprising a supply line for the liquid sample, and the gas space having an outlet connectable with the gas chromatograph, wherein the fluid space and/or the gas space is associated with at least one heating element, wherein the device is configured to absorb a sample volume of approximately 10 µl to 30 µl, and wherein the separating layer has a thickness of 10 µl to 300 µl and pores having a size between 0.05 µl and 5 µl.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 6 shows a device for preparing a liquid sample for a gas chromatograph according to a sixth exemplary embodiment, FIG. 7 shows a device for preparing a liquid sample for a gas chromatograph according to a seventh exemplary embodiment, and FIG. 8 shows the device according to the first exemplary embodiment in a system for analyzing samples.

DETAILED DESCRIPTION

Figure 1:
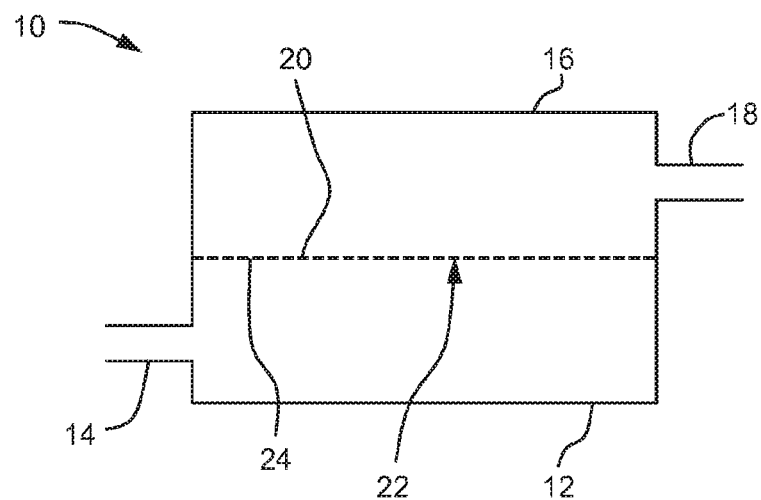
FIG. 1 shows a device for preparing a liquid sample for a gas chromatograph according to a first exemplary embodiment.

In an embodiment, the present invention provides a device for preparing a liquid sample for the direct injection of the corresponding gaseous sample to a micro-gas chromatograph that can handle smaller sample volumes.

In an embodiment, the present invention provides a device for preparing a liquid sample for a gas chromatograph, a fluid space and a gas space, which spaces are separated by a semipermeable separating layer, wherein the fluid space has a supply line for the liquid sample, and wherein the gas space has an outlet that can be connected with the gas chromatograph, wherein the fluid space and/or the gas space are associated with at least one heating element.

One advantage of the invention is that the penetration of the semipermeable separating layer by liquids, in particular the carrier liquid, is prevented, or at least reduced, whilst vapours, e.g. of the solvent, that may be generated by a heating element, can easily pass through the semipermeable separating layer. Because of this, only a small sample volume of approximately 10-30 µl is required for the headspace analysis, such that even valuable, scarce samples such as radiopharmaceuticals can be analysed in an economical fashion. The separating layer makes it possible to avoid radioactive substances, e.g. from an aqueous solution, passing into the gaseous phase. Thus, they remain in the liquid and do not enter the gas chromatograph. This prevents contamination of the gas chromatograph and its environment. Additionally, the heating element makes it possible for the analyte to pass through the semipermeable separating layer even at low ambient temperatures, thus allowing for any heating phase to be carried out, and a stable equilibrium to be reached, in a shorter time. As a result, less water vapour is formed in the case of aqueous solutions, thus minimising the risk of components of the gas chromatograph, e.g. semiconductor structures, being damaged by the water vapour. The prepared sample can be directly passed to the gas chromatograph via the outlet of the gas space, thus preventing any contamination of the sample that can occur in conventional methods when extracting the sample from a separate container. The one or more heating elements are associated with the fluid space and/or the gas space. If the one or more heating elements are associated with the fluid space, the liquid sample can be heated, thus accelerating the evaporation of the sample such that the stable equilibrium in the gaseous phase is reached even more quickly. If, additionally or alternatively, the gas space is heated by at least one heating element arranged there, the gas contained therein, which serves as a carrier to transport the gaseous analyte, will be able to absorb a larger quantity of gas from the liquid sample, thus allowing a larger quantity of prepared sample to be passed to the gas chromatograph. In particular, the device for preparing a liquid sample may also be connected to a micro-gas chromatograph, whilst a combination of the prior-art headspace evaporator and a micro-gas chromatograph would not be advantageous given the size and energy requirements of headspace evaporators.

In preferred embodiments, the separating layer is selectively permeable from at least one side, thus allowing it to be adapted to the respective sample. This provides particularly effective separation of the analyte from the carrier liquid. The selective permeability of the separating layer may be provided preferably by selection of appropriate materials or by means of a coating.

According to an embodiment of the invention, the device is configured to absorb a sample volume of approximately 10 µl to 30 µl.

According to an embodiment of the invention, the separating layer has pores of a size between 0.05 and 5 µm. This allows for particularly effective separation of the analyte in the liquid sample from the carrier liquid.

Advantageously, the separating layer is a membrane. Such separating layers are particularly thin and nonetheless stable, thus allowing the total size of the device to be minimised.

In preferred embodiments, the membrane consists of one of the following materials: polytetrafluoroethylene, polyvinylidene fluoride, polyester, polysulphone, cellulose derivative, polyamide, polyacrylate, or polypropylene. These materials have good chemical resistance, are easily sterilised, and are preferably hydrophobic, and thus allow as little water vapour as possible to pass through.

Advantageously, the membrane is elongated. Such a membrane has particularly high mechanical strength. More preferably, the membrane consists of elongated PTFE, thus additionally providing the membrane with good hydrophobic and chemical resistance properties.

Preferably, the separating layer comprises at least two layers, which may each also be formed as membranes. This allows the mechanical strength of the separating layer to be increased. The at least two layers may each be implemented differently, e.g. in terms of pore size or material. This allows the permeability to be influenced for various substances.

Advantageously, the separating layer comprises at least one layer that is hydrophobic. This prevents or reduces permeation of the separating layer by water, in particular when water is used as the carrier liquid. This can prevent water entering the gas space, and from there, reaching and damaging the gas chromatograph.

According to an embodiment of the invention, the separating layer has a thickness of 10-300 µm, more preferably 100-150 µm. Such separating layer thicknesses allow the analyte to pass through quickly, whilst nonetheless having sufficient stability for the manufacture and operation of the device.

Advantageously, the gas space is larger than the liquid space. This allows for sufficient analyte concentrations to be obtained even with smaller amounts of sample and analytes that are particularly soluble in the carrier liquid, such that even rare, expensive samples can be efficiently analysed. Furthermore, this allows the total size of the device to be minimised.

Preferably, the device has a pumping device to generate circulation in the gas space. This allows the volume of the gas containing the analyte to be defined in the gas space. The effect of a heating element, i.e. that a stable equilibrium is reached more quickly and/or a greater quantity of gas can be absorbed from the liquid sample, can be further potentiated by a pumping device.

FIG. 1 shows a device 10 for preparing a liquid sample for a gas chromatograph according to a first exemplary embodiment. The device 10 comprises a fluid space 12 with a supply line 14 for the liquid sample and a gas space 16 with an outlet 18. The outlet 18 can be connected with a gas chromatograph (see FIG. 8), thus allowing the prepared sample to be directly supplied to the gas chromatograph. A semipermeable separating layer 20 is arranged between the fluid space 12 and the gas space 16. The separating layer 20 separates the sample into a liquid phase and a gaseous phase. From the sample inserted into the fluid space 12, gas of a component of the sample intended for analysis, in some cases together with a solvent, passes through the separating layer 20 into the gas space 16 until a stable equilibrium is reached and saturation occurs. The separating layer 20 prevents liquids, in particular carrier fluids in which the component of the sample for analysis ('analyte') is transported, from passing through. A heating element is arranged on the gas space 16 and/or fluid space 12.

Examples of analytes include solvent residues of ethanol, acetonitrile, acetone, methanol, and 2-propanol. Generally, the carrier liquid consists of water, saline solution, or saline solution with additives such as pH buffers, e.g. phosphate buffer or acetate buffer, or stabilisers such as ascorbic acid. The evaporator proposed herein prevents the carrier liquid and any additives entering the gas chromatograph because it may be damaged by them. In particular, additives such as table salt in water as a carrier liquid allow for easier separation of analytes from the carrier liquid, in particular in polar solvents. This invention is particularly well suited for analysis using radiopharmaceuticals that may be present, for example, in aqueous solutions. The separating layer prevents the radioactive substances in these solutions entering the gas space and reaching the gas chromatograph from there. This prevents contamination of the gas chromatograph and its environment.

Suitable materials for a separating layer include, e.g., polymers or ceramics. If the separating layer is implemented as a polymer membrane, the following materials are preferred: polytetrafluoroethylene (PTFE), polyvinylidene fluoride (PVDF), polyester, polysulphone, cellulose derivative, polyamide, polyacrylate, or polypropylene. In particular, in all embodiments discussed bellow, separating layers including or consisting of a membrane of elongated PTFE film proved particularly effective. Preferably, the separating layer is selectively permeable from at least one side 22. This can be achieved by selecting an appropriate polymer. The separating layer is suited, in particular, to prevent the passage of radioactive substances into the gas space. Preferably, the separating layer is hydrophobic at least on the side 22 facing the fluid space 12, thus even more effectively preventing liquids from the same passing through the separating layer 20 into the gas space 16, and from there into the gas chromatograph. In the embodiments described here, the separating layer has pores 24, which may preferably have a diameter between app. 0.05 and app. 5 µm. In the exemplary embodiments shown in FIG. 1-6, the thickness of the separating layer is preferably between app. 10 and app. 300 µm, in order to provide good mechanical strength. Manufacturing-related fluctuations both in pore size and membrane thickness are possible.

The separating layer 20 shown in FIG. 1, for example, is a polytetrafluoroethylene membrane with good hydrophobic properties. Alternatively, in this example, the membrane may consist of polyvinylidene fluoride. In the example shown in FIG. 1, the size of the pores 24 is approximately 0.2 µm, and the membrane thickness is approximately 120 µm. In some variations, however, the pore size is approximately 0.5 µm, and the thickness may be in the range of 150 µm.

The device 10 shown in FIG. 1 has a housing consisting of aluminium and comprising the fluid space 12 and the gas space 16. An aluminium housing provides especially good heat conduction and is mostly inert to aqueous samples. The devices described in the other exemplary embodiments in reference to FIG. 2-6 also preferably have an aluminium housing. As an alternative to aluminium, it is also possible to use, for example, stainless steel or steel, brass, copper, bronze with a nickel surface coating, tin, zinc, rhodium, chromium, platinum, or gold for the housing.

The liquid sample can evaporate to a greater or lesser extent at room temperature, i.e. app. 20° C. or slightly above. In alternative embodiments, the liquid sample is slightly heated in order to accelerate the enrichment of the analyte(s) in the gas space 16, as described below by reference to FIG. 2.

Figure 2:
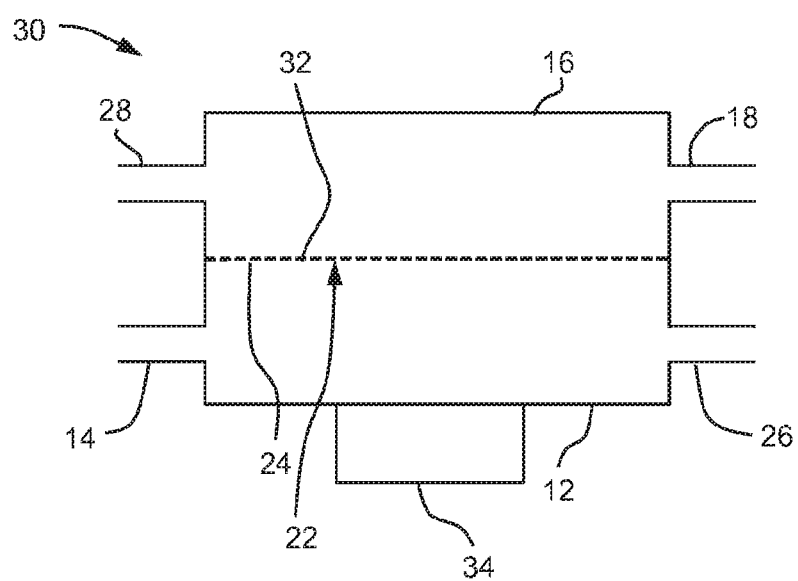
FIG. 2 shows a device for preparing a liquid sample for a gas chromatograph according to a second exemplary embodiment.

FIG. 2 shows a device 30 for preparing a liquid sample for a gas chromatograph according to a second exemplary embodiment. The device 30 differs from the device 10 of FIG. 1 in that the separating layer 32 in the second exemplary embodiment is a polypropylene membrane. Alternatively, the membrane may also consist, e.g., of a polyester, including a polycarbonate. In the example described here, the size of the pores 24 is approximately 0.05 µm, and the membrane 32 thickness is approximately 30 µm. In some variants, the pore size of the polyester membrane may also be app. 0.1 µm, and the thickness may be approximately 40 µm.

The device 30 additionally has an overflow 26 through which sample liquid can be drained from the fluid space or vented out of the fluid space 12. An inlet 28 for a carrier gas that is preferably filtered, and with which the gaseous sample can be transported to the gas chromatograph, is arranged at the gas space 16.

Additionally, the fluid space 12 of the device 30 is associated with a heating element 34 in the exemplary embodiment shown in FIG. 2. The heating element 34 heats the liquid sample in the fluid space 12, thus accelerating the evaporation of the analyte and its passage through the separating layer 32 and allowing a stable equilibrium in the gaseous phase to be reached within a shorter period of time. To this end, the liquid sample is heated by means of the heating element 34 to approximately 40-45° C. Alternatively, the liquid sample can also be heated to higher temperatures, e.g. temperatures between 60 and 100° C., which may be necessary, for example, if solvents that are difficult to evaporate, such as dimethyl sulphoxide (DMSO) and dimethylformamide (DMF), must be detected. The maximum temperature to which the liquid sample can be heated generally depends on the maximum permissible temperature for the material of the separating layer 32 and the connections for the liquids and gases.

In alternative embodiments, an additional heating element may be arranged on the gas space. This can be used, for example, to heat the carrier gas for the prepared sample. In this way, the carrier gas can absorb a greater quantity of the gaseous sample passing through the separating layer and pass it on to the gas chromatograph, thus making available a greater amount of sample for analysis. For smaller, compact devices, the heating element may be arranged only on the gas space because the fluid space would also be heated due to the thermal conductivity of the device.

Figure 3:
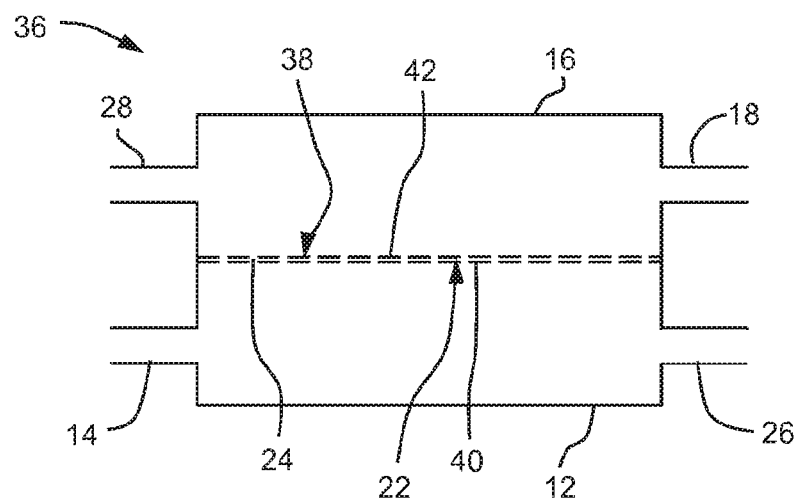
FIG. 3 shows a device for preparing a liquid sample for a gas chromatograph according to a third exemplary embodiment.

FIG. 3 shows a device 36 according to a third embodiment of this invention. The device 36 comprises a separating layer 38 comprising two layers 40, 42 between the fluid space 12 and the gas space 16. A heating element is arranged on the gas space 16 and/or fluid space 12. The two-layer separating layer 38 consists of two layers 40, 42 of cellulose derivatives, e.g. cellulose acetate and/or cellulose nitrate and/or a mixed polymer consisting of cellulose acetate and cellulose nitrate, and has greater compressive strength than a one-layer separating layer of the same thickness. The separating layer 38 may be formed as a two-layer 40, 42 membrane or be formed from two membranes, and the membrane, or at least one of the two membranes, may additionally be elongated. The size of the pores 24 in the first layer 40 is in the range of 1.2, and approximately 1.0 µm in the second layer 42. Thus, the permeability of the separating layer 38 is influenced, because some substances exiting the carrier liquid will be able to pass through the first layer 40, but will not be able to pass through the second layer 42 because of the smaller pore size. The layer thickness here is app. 50 µm. In some variations, it may also be app. 60 µm. The two layers may have the same or different thicknesses. In alternative embodiments, the layers 40, 42 of the separating layer 38 may also be made of the same material or material of different polymer classes. Other materials, such as PTFE, PVDF, PA, polysulphone, polyacrylate, or polypropylene may also be used for one or more layers of the separating layer. For example, the first layer 40 may be a membrane consisting of elongated PTFE with a pore size of 0.5 µm. The second layer 42 may be a polypropylene layer with which the PTFE membrane is laminated. The thickness of the two-layer separating layer may be approximately 120 µm. Alternatively, the separating layer may also consist of more than two layers, e.g. three, four, or five layers. These may each be made of the same material or different materials. Preferably, in alternative embodiments, at least one layer 40, 42 of the separating layer is hydrophobic, more preferably the layer 40 more closely facing the fluid space, so that as little water vapour as possible will pass into the gas space in the case of an aqueous carrier liquid.

Figure 4:
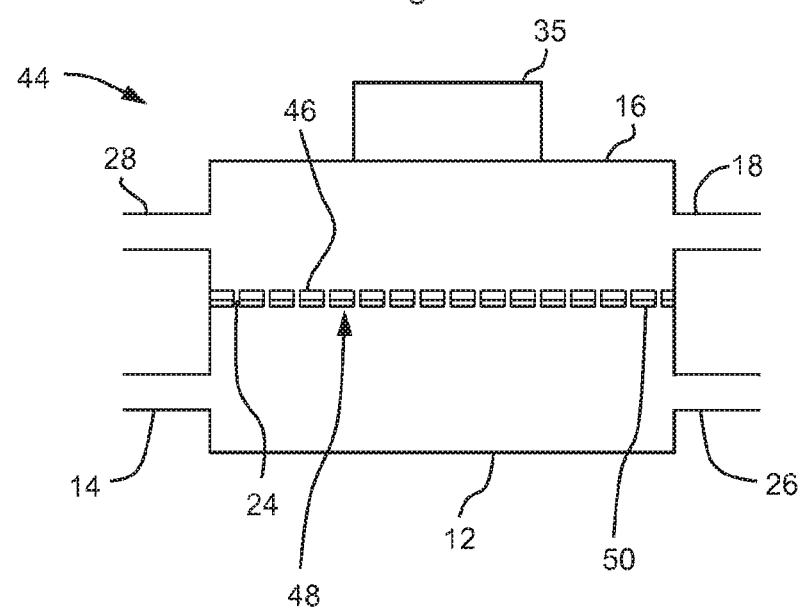
FIG. 4 shows a device for preparing a liquid sample for a gas chromatograph according to fourth second exemplary embodiment.

FIG. 4 shows a device 44 according to a fourth exemplary embodiment of this invention. The separating layer 46 arranged between the fluid space 12 and the gas space 16 is a membrane made of a polyamide, e.g. a nylon. In some variants, the membrane may also be made of a polysulphone, e.g. a polyethersulphone. The surface of the side 48 of the separating layer 46 that faces the fluid space 12 has a coating 50 that makes the separating layer 46 selectively permeable from this side 48. The purpose of this is for only certain substances to be able to pass through the pores 24 of the separating layer 46 into the gas space 16. Thus, the device 44 can be used to prepare liquid samples that contain multiple evaporating substances, thus allowing for the targeted filtration of a certain substance out of the liquid sample. The selective coating 50 may consist, e.g., of silicone, polyurethane, silica gel, alumina, a molecular sieve (zeolite), solgel, or active charcoal. For example, the selective coating 50 may be more hydrophobic than the material of the membrane. In alternative embodiments, the selective coating may also be hydrophilic. Such a coating can absorb undesired water residues that have passed through the membrane, e.g. due to material defects in the hydrophobic membrane. Following the analysis of the prepared sample in the gas chromatograph, the water may be removed from the membrane coating, e.g. by heating, and drained. The device 44 of FIG. 4 comprises a heating element 35 arranged on the gas space 16. Due to the compact design, the heating element 35 shown here not only heats the gas space 16; rather, the heat is transferred to the fluid space 12, thus also heating the liquid sample e.g. to app. 40-45° C. and accelerating the transition of the analyte into the gaseous phase.

In this example the pores 24 of the coated membrane forming the separating layer 46 have a diameter in the range of 1.5 µm. In some variations, they may also have a size of app. 2 µm. Depending on the design, the thickness of the uncoated membrane is approximately 90 or 100 µm, whilst the selective coating 50 is thinner than the uncoated membrane in preferred embodiments. In these preferred embodiments, the thickness of the coated membrane is less than 100 µm.

Figure 5:
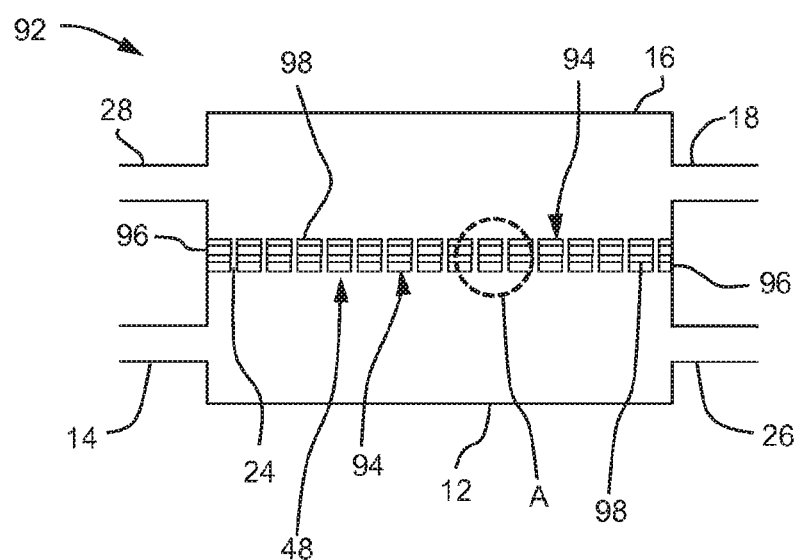
FIG. 5 shows a device for preparing a liquid sample for a gas chromatograph according to a fifth exemplary embodiment.
Figure 5A:
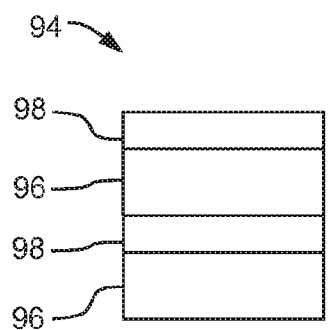
FIG. 5a shows a structure of a separating layer from FIG. 5.
Figure 5B:
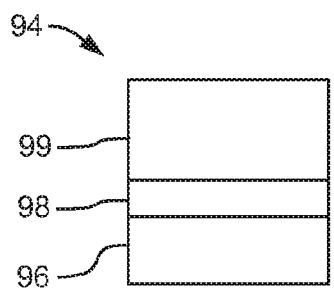
FIG. 5b shows a structure of a separating layer in an alternative embodiment.

FIG. 5 shows a device 92 according to a fifth embodiment. In this embodiment, there is a separating layer 94 consisting of two membranes 96 of elongated, hydrophobic PTFE, each laminated on one side with a polypropylene layer 98, between the fluid space 12 and the gas space 16. A heating element is arranged on the gas space 16 and/or fluid space 12. The structure of the separating layer 94 is shown in FIG. 5a in a simplified fashion without pores along a section A. This makes the individual membranes 96 more rigid and allows for better handling during manufacturing. In this example, the pore size of the membrane 96 is 0.5 µm each, and the coated membrane 96 thickness is app. 120 µm, respectively. The four-layer structure improves the retention properties for sample components that are undesirable in the gas space 16, e.g. aqueous aerosols. In alternative embodiments, instead of one of the membranes 96, or in addition to the two membranes 96, a hydrophilic membrane, e.g. consisting of cellulose acetate, mixed cellulose ester, coated cellulose acetate, or polycarbonate, may be arranged between the fluid space 12 and the gas space 16. The structure of a separating layer 94 having a single PTFE membrane 96, a polypropylene coating 98, and a hydrophilic membrane 99, which may also form a support structure, is shown in simplified form in FIG. 5b. Such a membrane 99 may lie, e.g., on the polypropylene layer 98 and be directed towards the gas space 16. The hydrophilic membrane 99 may also be applied as a film or designed as a grid. In other variations, fibreglass layers, e.g. with thicknesses in the range of 0.1-0.6 mm, and quartz fibre layers having a thickness of up to 1 mm may be arranged between the fluid space 12 and the gas space 16 in addition to or instead of one of the membranes 96 and/or a hydrophilic membrane 99, thus forming a support structure for the separating layer 94. Other alternative embodiments may also include more than one hydrophilic membrane 99. In all, instead of four layers, the separating layer may also comprise five, six, seven, eight, nine, ten or more layers.

FIG. 6 shows a device 52 according to a sixth embodiment of this invention. In the device 52 shown here, the gas space 54 is larger than the fluid space 12. This is particularly advantageous for analytes that are particularly soluble in the carrier liquid and thus resist rising into the gas space 54. Because of the larger gas space 54, given an equal initial concentration of the analyte in the liquid sample, a higher concentration of the analyte than would be the case with a gas space of equal size to the fluid space 12 is formed in order to achieve a stable equilibrium. For example, the volume of the fluid space 12 may be approximately 10 µl, and the volume of the gas space may 54 may be approximately 10 ml or more. In the example shown here, a heating element 56 that heats the liquid sample to app. 40° C., thus accelerating the passage of the analyte into the gas space 54, is arranged on the fluid space 12. Additionally, the device 52 has a pumping device 100 to generate circulation in the gas space 54. This allows the volume of the gas containing the analyte to be defined in the gas space 54. The homogeneity of the gas is improved, and pressure drop or dilution of the gas during transfer to the gas chromatograph is reduced. The pumping device 100 may, for example, be a suction pump. In some variants, this pumping device 100 may also be heated, e.g. to a temperature greater than 45° C., thus heating the circulating gas in order to accelerate the absorption of the analyte in the gas space.

The separating layer 58 between the fluid space 12 and the gas space 54 may be embodied like one of the separating layers from the figures described above. For example, a membrane made of PTFE or a polyacrylate, e.g., an acrylic copolymer, with a thickness of app. 170 µm or app. 180 µm and a pore size of approximately 3 µm or app. 5 µm, respectively, may be used as the separating layer 58.

FIG. 7 shows a device 102 according to a seventh embodiment of this invention. In the device 102 shown here, the gas space 104 is smaller than the fluid space 12. The analyte concentration in the liquid sample changes in particular with analytes that do not dissolve well in the carrier liquid, e.g. nonpolar solvents with water as the carrier fluid, and thus easily rise into the gas space 104, but only rise into the gas space 104 to a minor extent when it is small and the fluid space 12 is relatively large. Thus, an approximately constant concentration can be assumed. This is advantageous in particular if additional investigations are to be performed on the sample liquid. Thus, even at low temperatures, a stable equilibrium forms in the gaseous phase, thus obviating the need for a heating element for the fluid space. In the example shown here, however, a heating element 106 is arranged at the fluid space 12, which may be used, e.g., for analytes that only evaporate at higher temperatures. The separating layer 108 between the fluid space 12 and the gas space 104 may be embodied like one of the separating layers from the figures described above. For example, a membrane made of PTFE or a polyacrylate, e.g., an acrylic copolymer, with a thickness of app. 70 µm or app. 80 µm and a pore size of approximately 3 µm or app. 5 µm, respectively, may be used as the separating layer 108.

FIG. 8 shows a system 60 for analysing samples. In this system, a liquid sample is transported from a vessel 62 through a line 64 in a device 68 proposed herein in order to prepare the liquid sample for a gas chromatograph. The arrow 69 indicates the direction of transport of the liquid sample.

In the example, the device 68 for preparing the liquid sample corresponds to the device 30 described in detail in relation to FIG. 2 without a heating element. It comprises a fluid space 12 and a gas space 16, as well as a separating layer 32 between the fluid space 12 and the gas space 16. In alternative systems 60, one of the devices shown in FIG. 3-5 may also be used to prepare the liquid sample.

The gas space 16 receives a carrier gas that is transported via a compressed air line 72 from a valve 70. Air as well as helium, nitrogen, argon, or another inert gas or mixture of gases may be used as the carrier gas. The arrow 71 indicates the direction of flow of the carrier gas. The pressure of the carrier gas is monitored with a pressure sensor 74, and the carrier gas reaches the gas space 16 of the device 68 via a filter. An analyte contained in the liquid sample evaporates by means of a heating element in the fluid space 12 of the device 68, and passes through the pores 24 of the separating layer 32 into the gas space 16. Once a stable equilibrium has been reached in the gaseous phase, the gaseous sample is directly injected via an outlet 18 into a gas chromatograph 76 for analysis. The method for preparing the liquid sample is referred to as the 'stop-flow' method.

The device 68, as well as the devices 10, 30, 36, 44, 52 shown in FIG. 1-5 for preparing a liquid sample can also be operated in continuous current or countercurrent in lieu of the stop-flow method. Unlike the stop-flow method, in these approaches, the liquid sample is directed through the device as a continuous current, with the evaporated analyte passing into the gas space 16 via the separating layer 32. From the gas space 16, a suitable amount, e.g. 1 µl, of the prepared sample may be passed on to the gas chromatograph, e.g. in regular intervals or at any time, by means of a stream of filtered carrier gas.

The gas chromatograph 76 is a micro-gas chromatograph that differs from a classical gas chromatograph in terms of its smaller size. To date, micro-gas chromatographs have only been used for gaseous samples. Due to the small size of the device proposed herein to prepare a liquid sample and the small quantity of sample needed of only 10 µl-30 µl, compared to a classical headspace evaporator that operates with volumes from 1 ml-10 ml, liquid samples can be prepared for a micro-gas chromatograph and analysed particularly quickly and economically. Thus, the device proposed herein is well suited for valuable, scarce samples such as radiopharmaceuticals.

In alternative embodiments, the prepared sample may also be injected into a classic gas chromatograph.

Excess sample material and carrier gas can be removed from the gas chromatograph 76 by a pump 80 via a line 82 and a valve 84. The carrier liquid remaining in the fluid space 12 can be drained out of the fluid space 12 by a vacuum pump 86 via a line 88 and a valve 90. Alternatively, the sample can be returned to the vessel 62 by a vacuum in the line 64 or by the pump 86. The device 68 is then ready to prepare another liquid sample.

Other embodiments of devices for preparing a liquid sample for a gas chromatograph than those shown here are also consistent with the invention. In these embodiments, the separating layer may, for example, have other permeability properties than those described above. According to an embodiment of the invention, the separating layer is selectively permeable. The pore size of the separating layer may also deviate from the aforementioned sizes. Preferably, the pore size is between 0.05 and 5 µm, and may also depend, e.g., on the material used for the separating layer, with materials other than those listed in the above examples being acceptable for the separating layer. Thus, for example, one, two, or more elongated membranes may be used as a separating layer. Additionally or alternatively, the separating layer may also have one, two, three, four or more hydrophobic layers. For example, some or all of the membranes used may consist of materials such as polytetrafluoroethylene, polyvinylidene fluoride, polyester, polysulphone, cellulose derivatives, polyamide, polyacrylate, or polypropylene, and be coated or uncoated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

10 Device
12 Fluid space
14 Supply line
16 Gas space
18 Outlet
20 Separating layer
22 Side
24 Pore
26 Overflow
28 Inlet
30 Device
32 Separating layer
34 Heating element
35 Heating element
36 Device
38 Separating layer
40 Layer
42 Layer
44 Device
46 Separating layer
48 Side
50 selective coating
52 Device
54 Gas space
56 Heating element
58 Separating layer
60 System
62 Vessel
64 Line
68 Device
69 Arrow (direction of transport)
70 Valve
71 Arrow (direction of flow)
72 Pressurised air line
74 Pressure sensor
76 Gas chromatograph
80 pump
82 Line
84 Valve
86 Vacuum pump
88 Line
90 Valve
92 Device
94 Separating layer
96 Membrane
98 Layer
99 Membrane
100 Pumping device
102 Device
104 Gas space
106 Heating element
108 Separating layer
A Section

The invention claimed is:

1. A device for preparing a liquid sample for a direct injection of a corresponding gaseous sample to a micro-gas chromatograph, the device comprising:
a housing, comprising:
a fluid space comprising a supply line for the liquid sample;
a gas space comprising an outlet connectable with the micro-gas chromatograph; and
a semipermeable separating layer separating the device into a top portion for the gas space and a bottom portion for the fluid space,
wherein the top portion is positioned above the bottom portion such that evaporation from the liquid sample rises into the gas space,
wherein the fluid space and/or the gas space is associated with at least one heating element,
wherein the device is configured to absorb a sample volume of at most 30 µl, and
wherein the separating layer has a thickness of 10 µm to 300 µm and pores having a size between 0.05 µm and 5 µm.

2. The device according to claim 1, wherein the separating layer is selectively permeable from at least one side.

3. The device according to claim 1, the separating layer is a membrane.

4. The device according to claim 3, wherein the membrane consists of one of the following materials: polytetrafluoroethylene, polyvinylidene fluoride, polyester, polysulphone, cellulose derivative, polyamide, polyacrylate, or polypropylene.

5. The device according to claim 4, wherein the membrane is elongated.

6. The device according to claim 1, wherein the separating layer comprises at least two layers.

7. The device according to claim 1, wherein the separating layer comprises at least one layer that is hydrophobic.

8. The device according to claim 1, wherein the gas space is larger than the liquid space.

9. The device according to claim 1, further comprising a pumping device configured to generate circulation in the gas space.

10. A device for preparing a liquid sample for a direct injection of a corresponding gaseous sample, the device comprising:
a micro-gas chromatograph;
a housing, comprising:
a fluid space comprising a supply line for the liquid sample;
a gas space comprising an outlet connectable with the micro-gas chromatograph; and
a semipermeable separating layer separating the device into a top portion for the gas space and a bottom portion for the fluid space,
wherein the top portion is positioned above the bottom portion such that evaporation from the liquid sample rises into the gas space,
wherein the fluid space and/or the gas space is associated with at least one heating element,
wherein the device is configured to absorb a sample volume of approximately 10 µl to 30 µl, and
wherein the separating layer has a thickness of 10 µm to 300 µm and pores having a size between 0.05 µm and 5 µm.

* * * * *